United States Patent Office 2,823,240
Patented Feb. 11, 1958

2,823,240

ALKYLATION OF ALKYL AROMATIC HYDRO-CARBONS TO PRODUCE INDANES

Edmund Field and Morris Feller, Chicago, Ill., assignors to Standard Oil Company, Chicago, Ill., a corporation of Indiana No Drawing. Application September 26, 1952
Serial No. 311,806

7 Claims. (Cl. 260—668)

This invention relates to novel catalytic conversion processes, and particularly to novel processes and catalysts for the alkylation of certain cyclic compounds.

One of the objects of our invention is to provide a novel process for the alkylation of a cyclic organic compound at a carbon atom which is initially bound to at least one allylic hydrogen atom, that is to say an organic compound containing the structure

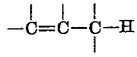

wherein the C–C double bond is contained within a cyclic structure and the open-ended bond structures leading from the carbon atoms are satisfied by covalent bonding to some other element, for example a hydrogen atom or the carbon atom of an alkyl group, and also to vinylogs of the organic cyclic compounds just described. An additional object is to provide an alkylation process for cyclic organic compounds, as above described, wherein monoolefins, preferably those which are normally gaseous and unbranched, are employed. Still another object is to provide an alkylation process employing cyclic organic compounds containing hydrogen allylically bound to a carbon atom and mono-olefins, in which alkylation process an alkali metal hydride catalyst is employed. A further object is to provide a novel process for the preparation of indane and alkyl-substituted indanes.

Another object of our invention is to provide a novel process for the preparation of n-alkylaromatic hydrocarbons. A further object is to provide a novel process for the preparation of isoalkylaromatic hydrocarbons. An additional object is to provide a novel alkylation process employing the charging stocks above described, in which process the essential catalytic components are an alkali metal hydride and metallo-aluminum hydrides, having the formula $M(AlH_4)_n$, wherein M represents a metal selected from the group consisting of alkali metals and alkaline earth metals and $n$ represents the valence of the metal M.

Yet another object of our invention is to provide a novel process for alkylating alkylbenzenes containing at least one allylic hydrogen atom, for example toluene, with an olefin such as ethylene in the presence of an alkali metal hydride such as sodium hydride or in the presence of an alkali metal hydride such as sodium hydride plus a metallo-aluminum hydride such as lithium aluminum hydride. These and other objects of our invention will become apparent from the ensuing description thereof.

We have discovered that a smooth, catalytic alkylation reaction can be effected at a carbon atom containing at least one allylic hydrogen atom, said carbon atom being bound to a carbon atom which is double-bonded within a ring structure, by the employment of mono-olefins as alkylating agents, particularly ethylene, although we may employ other unbranched normally gaseous mono-olefins. A suitable alkylation temperature is employed, usually between about 160° C. and about 350° C., and a suitable reaction pressure, most of which is due to the partial pressure of the olefinic alkylating reagent, said reaction pressure being at least about 200 p. s. i. g., but which may extend to much higher values, for example to about 10,000 p. s. i. g., 20,000 p. s. i. g., or even higher pressures. The alkylation catalyst, which may be used in relatively small proportions based upon the reactants, comprises essentially an alkali metal hydride, namely a compound having the general formula MH, wherein M is a metal selected from the group consisting of lithium, sodium, potassium, rubidium, cesium, or suitable mixtures thereof. We have found that the alkylation rate may be greatly increased by employing a mixture of hydride catalyst components, one component of which is an alkali metal hydride, as above described, and another component of which is a metallo-aluminum hydride having the general formula $M(AlH_4)_n$, wherein M is an alkali metal or alkaline earth metal and $n$ is the valence of M.

Pursuant to our invention, it is possible to alkylate:

(1) Toluene by ethylene in the presence of sodium hydride to form n-propylbenzene;

(2) Toluene by ethylene in the presence of sodium hydride to produce 3-phenylpentane;

(3) Toluene by ethylene in the presence of a mixture of sodium hydride and lithium aluminum hydride to form n-propylbenzene, 1-phenylpentane, 3-phenylpentane and indane;

(4) Benzene by ethylene in the presence of a mixture of sodium hydride and lithium aluminum hydride to form ethylbenzene and 1-ethyl-ethylbenzene;

(5) Ethylbenzene by ethylene in the presence of sodium hydride to form 1-ethyl-ethylbenzene;

(6) n-Propylbenzene by ethylene in the presence of a mixture of sodium hydride and lithium aluminum hydride to form 1-ethyl-n-propylbenzene and 3-ethylindane.

Specific operating examples including experimental details will be set forth hereinafter.

The following examples are intended to illustrate but not unduly to limit the process of the present invention. Examples 1–6, inclusive, of the following series were performed in a 250 ml. stainless steel reactor provided with a reciprocating magnetically-actuated stirring device.

EXAMPLE 1

The reactor was charged with 100 ml. of toluene (0.94 m.) and 2.5 g. of sodium hydride, closed and heated to a temperature in the range of 230–233° C., while stirring the reactor contents. Ethylene was then pressured into the reactor to pressures which varied between about 800 and about 1000 p. s. i. g., the ethylene pressure being maintained while adding further amounts as the ethylene was consumed in reaction. The total reaction period was 24 hours, over the course of which the pressure drop of ethylene was 705 p. s. i. g. The total ethylene charged was 34.0 g. The total gas recovery from the reactor was 14.6 g. and the mass spectrometer analysis indicated a small proportion of butylenes and some ethane. The liquid reaction products were hydrolyzed and acidified to yield 90.6 g. of a liquid having a density $(d_4^{20})$ of 0.861 and $n_D^{20}$ of 1.4927. The toluene conversion was 77%. The total weight of product was 47.1 g. of which 56.1 weight percent was n-propylbenzene and 39.3 weight percent was 3-phenylpentane.

EXAMPLE 2

The reactor was charged with 60 ml. of xylenes consisting of equal proportions of all three isomers, 1.2 g. of sodium hydride (0.05 m.), 0.5 g. of lithium aluminum hydride (0.016 m.), closed, stirring begun, and the reactor maintained at 160–170° C. for one-half hour and at 235–238° C. for three hours while maintaining an ethylene pressure between 800 and 1100 p. s. i. g. The total quantity of ethylene charged was 26.0 g. At the end of the reaction period, the reactor was allowed to cool to room temperature, gases were vented therefrom to atmospheric pressure and the liquid contents of the reactor were hydrolyzed, acidified and separated from the aqueous acid layer. The liquid organic reaction products were carefully fractionated in a Stedman fractionation column containing the equivalent of 30 theoretical plates at a 4:1 reflux ratio. Of the 53.9 g. of liquid organic products, 37.7 weight percent was n-propylbenzene. Infrared spectroscopic analysis of higher boiling products show the presence of 3-n-propyltoluene.

EXAMPLE 3

The reactor was charged with 100 ml. of toluene (0.94 m.), 1.65 g. of sodium hydride (0.0685 m.), and 1.3 g. of lithium aluminum hydride (0.0342 m.), closed, and the run was carried out as in the previous examples. The operating temperature varied between 227 and 232° C. and the ethylene pressure varied between 800 and 1000 p. s. i. g. The reaction period was 12 hours, during which time a total of 48.0 g. of ethylene were charged. The reactor was cooled, gases vented to atmospheric pressure and the mixture of solid and liquid products in the bomb were filtered. The filtrate was cautiously hydrolyzed with water, then strongly acidified with 6 N HCl to produce an aqueous acid lower layer and an upper layer of liquid organic products (75.7 g.) which were distilled in a Stedman fractionating column to produce 33.5 g. of products boiling above the boiling point of toluene, which were subjected to highly precise fractional distillation in order to effect separation into various constituents. Precise fractionation showed that of the 33.5 g. of liquid products, 37.5 weight percent was n-propylbenzene, 5.6 weight percent was 1-phenylpentane, 5.7 weight percent was 3-phenylpentane, 7.2 weight percent was indane, 2.3 weight percent was an octene and 41.7 weight percent comprised higher boiling materials. The toluene conversion in this operation amounted to 43 percent.

EXAMPLE 4

The reactor was charged with 100 ml. of toluene (0.94 m.), 1.2 g. of sodium hydride (0.05 m.), 2.0 g. of lithium aluminum hydride, (0.053 m.), closed, heated to a reaction temperature between 224° and 231° C. while ethylene was pressured in to a value between about 600 and about 925 p. s. i. g. The total reaction period was 8.5 hours, over the course of which 53.0 g. of ethylene (1.89 m.) were charged to the reactor. The ethylene charging stock to the reactor, analyzed on a mass spectrometer, contained 97.0 v. percent ethylene, 0.9 v. percent methane, 1.6 v. percent ethane, 0.3 v. percent propane, 0.1 v. percent n-butane and 0.1 v. percent air. The product work-up was as in the previous examples. The mass spectrometer analysis of the off-gas from the reactor showed it to contain 22.5 v. percent ethylene, 40 v. percent ethane, 17.6 v. percent n-butane and 10.4 v. percent butenes. The toluene conversion was 40% and the weight of product boiling above toluene was 35.1 g. The products comprised 22.1 w. percent of n-propylbenzene, 11 w. percent 1-phenylpentane (no 3-phenylpentane), 8.2 w. percent indane, 8.3 w. percent octanes, 4.3 w. percent decenes and 46.1 w. percent of bottoms.

EXAMPLE 5

The charge to the reactor was 100 ml. toluene (0.94 m.), 0.82 g. of sodium hydride (0.0342 m.), and 2.6 g. of lithium aluminum hydride (0.0685 m.). Reaction was effected at 230° C. with the injection of ethylene to maintain a partial pressure between 800 and 1000 p. s. i. g. over the course of 8.5 hours. The total amount of ethylene charged to the reactor was 51.5 g. (1.83 m.). The toluene conversion was 26%. Product work-up was effected as described in previous examples to yield 18.1 g. of an amber colored liquid of which 14.3 w. percent was n-propylbenzene, 9.6 w. percent was 1-phenylpentane (no 3-phenylpentane), and the remainder comprised largely higher boiling $C_8$, $C_{10}$ and $C_{12}$ olefins and bottoms.

EXAMPLE 6

The reactor was charged with 100 ml. of toluene (0.94 m.) and 3.8 g. of lithium aluminum hydride (0.1027 m.), pressured with ethylene to a partial pressure varying between 600 and 1000 p. s. i. g. at reaction temperatures between 227° and 230° C. for about 9 hours. Although there seemed to be no solid products, the reaction mixture was filtered through glass wool and thereafter hydrolyzed and acidified as in previous runs. The toluene conversion was 8.5% and the weight of product boiling above toluene was 8.1 g. Analysis of the product indicated 21.2 w. percent n-propylbenzene, 15.9 w. percent 1-phenylpentane (no 3-phenylpentane), and the remainder $C_8$ and higher boiling olefins and other hydrocarbons. A mass spectrographic analysis of the off-gases obtained from the reactor upon completion of the reaction, cooling and venting, showed the presence therein of ethylene, butylenes and ethane.

A summary of important features of the above examples are presented in the following table:

*Table*

| Example | 1 | 2 | 3 | 4 | 5 | 6 |
|---|---|---|---|---|---|---|
| Charge: | | | | | | |
| Aromatic,[1] cc | T100 | X60 | T100 | T100 | T100 | T100 |
| Aromatic, mols | .94 | .49 | .94 | .94 | .94 | 0.94 |
| Ethylene, g | 34.0 | 26.0 | 48 | 53 | | 53.5 |
| Ethylene, p. s. i. g | 700 | 800–1,000 | 800–1,000 | 600–925 | 800–1,000 | 600–1,000 |
| NaH, g | 2.5 | 1.5 | 1.65 | 1.2 | 0.82 | 0 |
| LiAlH$_4$, g | | 0.5 | 1.3 | 2.0 | 2.6 | 3.8 |
| Mols NaH/LiAlH$_4$ | | 3 | 2 | 1 | 0.5 | 0 |
| Aromatic conversion, percent | 77 | 50 | 43 | 40 | 26 | 8.5 |
| Products: | | | | | | |
| Total Vol., cc | 48.5 | 57 | 38.7 | 41.5 | 22.0 | 10.0 |
| Total Wt., g | 41.7 | 53.9 | 33.5 | 35.1 | 18.1 | 8.1 |
| W. Percent of— | | | | | | |
| n-propylbenzene | 54.6 | | 37.5 | 22.1 | 14.3 | 21.2 |
| 1-phenylpentane | | | 5.6 | 11.0 | 9.6 | 15.9 |
| 3-phenylpentane | 39.3 | | 5.7 | 0 | 0 | 0 |
| Indane | 0 | | 7.2 | 8.2 | 0 | 0 |
| $C_8$ | 0 | 62.3 | 2.3 | 8.3 | 10.1 | 17.9 |
| $C_{10}$ | 0 | | 0 | 4.3 | 19 | 14.1 |
| $C_{12}$ | 0 | | 0 | | 10.8 | |
| Bottoms | 6.1 | | 41.7 | 46.1 | 36.2 | 30.9 |

[1] T represents toluene and X represents xylenes.

In the following runs a stainless steel reactor having 100 ml. capacity and a magnetically-actuated reciprocating stirrer was employed.

EXAMPLE 7

The reactor was charged with 50 ml. of C. P. benzene, 2.0 g. sodium hydride, 0.1 g. of lithium aluminum hydride and pressured with dried and commercial ethylene ($CO_2$-free) to 400 p. s. i. at room temperature, thereafter heated to 180° C. for one-half hour and thereafter brought to the reaction temperature of 230° C., thereby obtaining a total ethylene pressure drop of 4950 p. s. i. g. Ethylene addition to the reactor was continued at the reaction temperature to maintain an ethylene partial pressure of 900–1000 p. s. i. g. As a result of the reaction, a solid product was produced to the extent of 0.92 g. per g. of catalyst, together with 8.5 ml. of alkylation products of which the molar percentages were: ethylbenzene, 36; 2-butylbenzene, 12; and higher molecular weight alkylates, 52. The alkylate contained some diphenyl, which was isolated; its identity was proved by a mixed melting point determination (no depression) with an authentic sample and by a true boiling point determination.

EXAMPLE 8

The reactor was charged with 50 ml. of C. P. toluene, 2 g. of sodium hydride, and dried and decarbonated commercial ethylene. Ethylene absorption began at 180° C. and was continued for 30 minutes with no apparent reaction. The principal reaction was effected at 235° C. (following an induction period) and ethylene pressure of 970 p. s. i. g. for a period sufficient to obtain a total ethylene pressure drop of 5280 p. s. i. g. The amount of alkylate boiling above toluene was 37 ml. of which the molar percentages were: n-propylbenzene, 46.5; 3-phenylpentane, 49.5 and higher molecular weight alkylates, 4.

EXAMPLE 9

The reactor was charged with 50 ml. C. P. toluene, 2 g. of sodium hydride and 0.1 g. of lithium aluminum hydride. Ethylene absorption began at 180° C., at which temperature the reactor was maintained for 30 minutes. The principal reaction was effected at 234° C. with an ethylene pressure of 935 p. s. i. g. over the course of 310 minutes, during which time the total ethylene pressure drop was 2005 p. s. i. g. Fractional distillation of the reaction products showed the following distribution in mol percent: n-propylbenzene, 59; 3-phenylpentane, 8.5; indane, 12.5 and higher molecular weight alkylates, 20. The total volume of alkylate produced was 31 ml.

EXAMPLE 10

The reaction bomb was charged with 50 ml. of C. P. toluene, 0.6 g. of sodium hydride, and 1 g. of lithium aluminum hydride, and was then pressured at room temperature with dehydrated and decarbonated commercial ethylene and gradually heated. Significant ethylene absorption, as indicated by pressure drop, began at 180° C. at which temperature it was continued for 30 minutes. The temperature was then raised to 235° C. with an ethylene partial pressure of 950 p. s. i. g. and maintained under these conditions for 295 minutes, with resultant ethylene pressure drop of 1535 p. s. i. g. The reaction yielded 15.1 ml of alkylate of which the molar composition (percent) was: n-propylbenzene, 45; indane, 19; and higher molecular weight alkylate, 36.

EXAMPLE 11

The reactor was charged with 50 ml. of a xylenes mixture which had been dried with calcium hydride, 2.5 g. of sodium hydride and 0.1 g. of lithium aluminum hydride. Dehydrated and decarbonated commercial ethylene was pressured into the reactor at 25° C. whereafter the contents were heated to 230° C. and an initial pressure of 1085 p. s. i. g., at which temperature a large pressure drop was observed. The reaction yielded 32.6 ml. of alkylates boiling above the xylenes boiling range. Analysis of the alkylation product indicated the following molar distribution: n-propyltoluene, 40%; dipropylbenzenes, 47%; methylindane, 2.5% and higher molecular weight alkylates, 10.5%.

EXAMPLE 12

The reactor was charged with 50 ml. of n-propylbenzene, 2 g. of sodium hydride and 0.1 g. of lithium aluminum hydride. Dried and decarbonated commercial ethylene was introduced into the reactor at room temperature and the reactor was heated to 232° C. and an initial ethylene pressure of 1110 p. s. i. g. for a period of time sufficient to obtain a total ethylene pressure drop of 2910 p. s. i. g. The reaction yielded 26 ml. of alkylate boiling above n-propylbenzene, which was analyzed as follows (molar percentages): 3-phenylpentane, 56; ethylindane, 14 and higher molecular weight alkylates, 13.

An attempt was made to alkylate toluene with ethylene in the presence of calcium hydride, as follows:

A 100 ml. reactor, as described above, was charged with 50 ml. toluene and 2 g. of calcium hydride, pressured with ethylene to 300 p. s. i. g. at 25° C. and heated to 355° C. with no indication whatsoever of pressure drop. The only new constituent in the off-gas was 1.6% of methane. In a reproduction of this attempt at 355° C. and ethylene partial pressure of 1270 p. s. i. g., no reaction could be obtained.

While the above examples have served concretely to illustrate our novel alkylation process and catalyst, they should not be construed as undue limitations of our invention, which is capable of broader application and extension as will be pointed out in more specific detail hereinafter.

The alkali metal hydride catalysts generally increase in activity with increasing molecular weight of the metal therein combined. Therefore the proportion of alkali metal hydride which is employed as the catalyst may be varied in proportion to its relative activity, bearing also in mind the other factors which affect the reaction rate. Usually an alkali metal hydride is employed in our catalytic conversion processes in proportion between about 0.005 and about 5 percent by weight of the organic cyclic compound which is to be alkylated, although higher proportions may be employed, e. g., 10 weight percent. More often, we may employ an alkali metal hydride catalyst in proportions within the range of about 0.01 to about 2 weight percent, preferably about 0.1 to about 1 weight percent, based upon the weight of the cyclic organic compound which is to be alkylated. It should be understood that when the cyclic organic compounds employed as charging stock contain functional groups which form complexes with the alkali metal hydride or otherwise react with or inactivate said hydride, a catalytic proportion of alkali metal hydride in excess of the amount thus complexed or reacted with said functional group will be employed. In general, we prefer to employ sodium hydride as a catalyst or catalyst component because of its modulated activity and relative cheapness.

As a co-catalyst with the above-described alkali metal hydrides, we may employ a metallo-aluminum hydride having the general formula $M(AlH_4)_n$, in which formula M represents an alkali metal or an alkaline earth metal and $n$ represents a valence of M, which is to say 1 or 2. To some extent the $M(AlH_4)_n$ compound may be converted by an olefinic alkylating agent such as ethylene into compounds having the structure

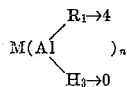

wherein R represents an alkyl substituent derived from the olefinic alkylating reagent and the sum of R and H is 4. Thus, for example, in the course of ethylations conducted with ethylene in the presence of an alkali metal hydride and lithium aluminum hydride, some proportion of the lithium aluminum hydride is converted to alkyl derivatives, the fully alkylated derivative being LiAl(C₂H₅)₄ or possibly LiH.Al(C₂H₅)₃. Part or all of the metallo-aluminum hydride may be replaced by AlH₃ or aluminum alkyls such as Al(C₂H₅)₃.

The proportion of metallo-aluminum hydride which we may employ is between about 0.05 and about 2 parts by weight per part by weight of the alkali metal hydride, more often between about 0.1 and about 1 part by weight of metallo-aluminum hydride per part by weight of alkali metal hydride. Thus, in accordance with our invention, we may employ such mixed catalysts as sodium hydride with NaAlH₄; sodium hydride with LiAlH₄; cesium hydride with Ca(AlH₄)₂; sodium hydride or lithium hydride with Ba(AlH₄)₂; sodium hydride with Sr(AlH₄)₂; and sodium hydride with Mg(AlH₄)₂.

It will be appreciated that the metal hydride catalysts employed for the purposes of our novel conversion processes are usually prepared externally and inserted into the reaction zone for use. However, in situ preparation of metallic hydride is feasible and desirable in some instances and may be carried out using known hydride-forming procedures, as desired, e. g. by adding hydrogen to a partial pressure of, say, 50 to 200 p. s. i. g. to the reactor containing the desired alkali metal.

Especially when operating at elevated temperature within the alkylation temperature range, for example about 200° C. to about 300° C., hydrogen may be added to the reaction zone to a partial pressure value lying between about 20 and about 400 p. s. i. g. The presence of hydrogen within the reaction zone sometimes exerts one or more desirable effects, one of which may be to prevent over-extensive decomposition of thermally unstable metal hydride catalysts at temperatures within the upper portion of the alkylation temperature range.

In addition to the cyclic organic compounds whose alkylation has been described in the above specific examples, we may employ a wide variety of other alkyl-aromatic hydrocarbons containing at least one allylic hydrogen atom, for example, isopropylbenzene, mesitylene, pseudocumene, hemimellitene, p-cymene, durene, isodurene, n-butylbenzene, n-amylbenzene and the like; aromatic hydrocarbon derivatives such as safrole or its 2,3-dihydro derivative; various alkylnaphthalenes containing at least one allylic hydrogen atom, such as 1- or 2-methylnaphthalene, 1- or 2-ethylnaphthalene, n-propylnaphthalenes, benzylnaphthalenes, benzyl methylnaphthalenes, 2-methyl-1,4-naphthoquinone, and the like. Other examples of cyclic organic compounds containing at least one allylic hydrogen atom which may be employed in our conversion processes include tetralin, fluorene, acenaphthene, dihpenylmethane, 1,2-diphenylethane, benzylcyclohexane, 1,4-dihydronaphthalene, 9,10-dihydrophenanthrene, indane, indene, 2-oxy-1,3,4-trihydronaphthalene; anthracene hydrocarbons containing a methyl group having at least one allylic hydrogen atom such as 1- or 2-methylanthracene, 9,10-dihydroanthracene, 2-methylanthraquinone; anthrone or its sulfur analogue, viz. thioanthrone.

In addition various aliphatic cycloolefins containing at least one allylic hydrogen atom may be employed, for example cyclopentene, 3-methylcyclopentene, cyclopentadiene, cyclohexene, 2-methylcyclohexene, 3-methylcyclohexene, 2-ethylcyclohexene, 3-ethylcyclohexene, 3-propylcyclohexene, 1,3-cyclohexadiene, 1,4-cyclohexadiene, 4-vinylcyclohexene, 1,5-cyclooctadiene, cyclooctatetraene, 2-indanone and 3-indanone.

Certain terpene hydrocarbons containing at least one allylic hydrogen may be employed as charging stocks in our alkylation process, for example dipentene, alpha-terpinene, alpha- or beta-pinene, and the like.

In addiiton to some of the heterocyclic compounds named above, we may employ others such as thiophene, benzothiophene, 2-methylthiophene, 2-ethylthiophene, and the corresponding 3-derivatives; alpha-, beta- or gamma-picolines; furan, 2-methylfuran, 2,3-benzofuran, durene-p-quinone, quinaldine and the like.

We may employ vinylogous derivatives of various of the above-named compounds. Thus, in lieu of toluene, we may employ its vinylog, propenylbenzene, which has the structure CH₃—CH=CH—C₆H₅. We may also employ alkenylaromatic hydrocarbons, particularly alkenylbenzenes containing at least one allylic hydrogen atom at a side-chain carbon atom such, for example, as 2-methyl-2-butenylbenzene (isoprenylbenzene).

The preferred alkylating agents for the purpose of our invention are normally gaseous unbranched mono-olefins, viz., ethylene, propylene and 1- and 2-butenes. However, higher molecular weight monoolefinic hydrocarbons, particularly those of unbranched structure may be used, e. g., 1-pentene, 1-heptene, 1-dodecene, etc.

It is necessary to observe rigorous precautions to insure the purity of both the cyclic organic compound charging stock, the olefinic alkylating agent, and the reaction zone in general. Such catalyst-consuming reagents or reaction inhibitors or retarders as oxygen, water, carbon dioxide, hydrogen sulfide, organic sulfur compounds such as alkyl or aryl mercaptans or thioethers should be excluded from the reaction system. The removal of these noxious materials from the charging stocks can be effected by known processes. Thus, the cyclic organic compound charging stock can be freed of sulfur compounds by acid treatment, for example, with anhydrous p-toluenesulfonic acid, sulfuric acid, anhydrous HF or HF—BF₃ mixtures, or by equivalent treatments, for example with aluminum halides or other Friedel-Crafts catalysts, maleic anhydride, calcium, calcium hydride, sodium or other alkali metals, alkali metal hydrides, lithium aluminum hydride, hydrogen and hydrogenation catalyst (hydrofining), filtration through a column of copper grains or grains of a metal of the Eighth Group of the Periodic Table, contacting with a mixture of an active metal hydride such as an alkali or alkaline-earth metal hydride and a hydroforming catalyst such as a molybdena-alumina catalyst, or by combinations of suitable treatments.

The ethylene or other olefinic alkylating reagent can be treated, for example, at reaction pressure of somewhat lower pressure to remove impurities which may be contained therein. Thus, the ethylene or other olefin can be compressed to a pressure of at least about 200 p. s. i. g. and contacted with a suitable deoxygenating agent such as metallic copper grains at a suitable temperature, for example, at about 150° C. The ethylene or other olefinic agent can be dehydrated, preferably after deoxygenation, by contact with a suitable dehydrating agent, such as adsorptive alumina, anhydrous calcium sulfate, silica gel, or equivalent drying materials. Carbon dioxide can be removed from the olefinic charging stock by suitable methods, for example, by contact thereof with sodium hydroxide deposited upon asbestos.

The molar ratio of cyclic organic compound to the olefinic alkylating reagent which is employed in our process is usually high, for example, of the order of about 2 to about 10, but the overall range may be between about 0.2 and about 20 mols of the cyclic compound per mol of the olefinic alkylating reagent. In general, we prefer to operate with about 1 to about 5 mols of the cyclic organic compound per mol of olefinic alkylating reagent. When the process is operated with a substantial molar excess of cyclic compound relative to olefin, the opportunity for the olefin to engage in side reactions such as polymerization or polymerization and cyclization, especially to form highly colored products, is substantially diminished.

The time of contact of the reagents with the catalyst will depend upon the intimacy of contact, reaction temperature, the concentrations and reactivities of reactants and catalyst, etc. In specific cases the variable of reaction time can be readily explored to determine the optimum operating period. Usually we employ reaction periods in the range of about 5 minutes to about 24 hours, more often between about 60 and about 240 minutes.

It will be appreciated that the process herein described is amenable to a variety of processing expedients normally pursued in chemical engineering practice. The process may be operated batchwise, for example in stirring autoclaves. The process may be operated by passing the reagents through fixed catalyst beds. The process may be operated by slurrying the reagents and catalyst(s) and passing the slurry, which may be suitably diluted with a reaction diluent, through a reaction zone, which may suitably take the form of a pressure-resistant tube or coil, with provisions for multiple-point injection of the olefinic reagent along the length of the reaction zone, and with suitable heat-exchange arrangements to provide for proper or graduated temperature control during the course of the reaction. The reaction products can be separated from the catalyst residue by conventional means such as by hydroclones (cyclones operating upon liquid materials containing finely divided suspended solids), filtration, centrifuging, a combination of the above-mentioned means, or other means known in the art. Unreacted olefinic reagent, if gaseous, can readily be separated from the liquid reaction products by depressuring to substantially atmospheric pressure, whereupon a gas stream comprising unreacted olefinic alkylating reagent is produced, and can suitably be recycled to the reaction zone, usually without the need for re-purification. Liquid olefinic alkylating reagent can be separated from liquid alkylation reaction products by fractional distillation. Unreacted cyclic organic compounds can ordinarily be separated from the alkylation reaction product by fractional distillation and can usually be recycled to the alkylation reaction zone without the need for re-purification. A portion of the unconverted cyclic organic compound can be employed as a slurrying medium for catalyst particles, as desired. Undesirable alkylation products can be recycled to the reaction zone in proportions up to the equilibrium proportion in order to retard the continued formation of such alkylation products.

Usually we prefer to contact the cyclic organic compound which is to be alkylated and the reaction diluent, if any, and the catalyst in the absence of oxygen or other reaction retarders or poisons by bringing them together at ambient temperature, following which agitation or contacting of the mixture is started and the reaction zone is gradually heated to the reaction temperature in the absence of the olefinic alkylating reagent, optionally in the presence of added hydrogen which may be present at partial hydrogen pressures ranging from about 15 to about 200 p. s. i. g. When the reaction temperature has been reached, the olefinic alkylating reagent is introduced into the reaction zone. It will be appreciated that other methods of effecting the alkylation can be employed. If desired, before the olefinic alkylating reagent is introduced into the reaction zone, the reaction zone may be wholly or partially depressured, care being taken to avoid the introduction of oxygen, air or moisture into said reaction zone, and the olefinic alkylating reagent is then introduced into said reaction zone.

In one desirable mode of operation, the olefin may be contacted with the catalyst at about 160–200° C. and the cyclic organic compounds may thereafter be added to the reaction mixture.

The alkylation reaction products, especially the indane or alkylindanes, which can be produced by the present process are susceptible of a wide variety of uses. Thus, the aromatic portion of the indane molecule can be nitrated, sulfonated, chlorinated, metalated, etc. to produce extremely useful derivatives. Indane can be readily dehydrogenated in the presence of a catalyst to produce indene in substantial yields (Rep. Acad. Sci. USSR 66, 401–4 (1949)). It is also possible to effect catalytic hydrogenation of the benzene portion of the indane molecule by means of molecular hydrogen and various well-known hydrogenation catalysts, employing conventional hydrogenation techniques, to produce bicyclononane (3,4,0). Indane and ethylindanes can also be readily alkylated with olefins in the presence of acidic catalysts to produce interesting and useful alkyl derivatives, for example as described by W. M. Kutz et al., J. Am. Chem. Soc., 70, 4026 (1948). Known methods can be employed to convert indane and alkylindanes to the corresponding indanols and indanones, which have been employed as insect repellants for fabrics. The catalytic oxidation of indane and alkylindanes, particularly with air or oxygen, and catalysts such as vanadium pentoxide upon a suitable support, such as pumice, at temperatures between about 300° C. and about 400° C. yields valuable dicarboxylic acids.

The alkylbenzenes prodced by the present alkylation process are likewise susceptible to many chemical conversions and ultimate industrial uses, for example, by treatment thereof with nitrating, sulfonating, halogenating, metalating, and other conversion reagents.

Having thus described our invention, what we claim is:

1. A process for the alkylation of an alkylaromatic hydrocarbon having at least one allylic hydrogen atom, which process comprises contacting a substantial molar excess of said alkylaromatic hydrocarbon, based on ethylene, with ethylene in the presence of an alkali metal hydride and an alkali metal aluminum hydride at a temperature between about 160° C. and about 350° C. and a pressure of at least about 200 p. s. i. g., and recovering an alkylation product comprising an indane hydrocarbon thus produced.

2. The process of claim 1 wherein said alkali metal hydride is sodium hydride and said alkali metal aluminum hydride is lithium aluminum hydride.

3. The process of claim 1 wherein said alkylaromatic hydrocarbon is toluene, said alkali metal hydride is sodium hydride and said alkali metal aluminum hydride is lithium aluminum hydride.

4. The process of claim 1 wherein said alkylaromatic hydrocarbon is ethylbenzene and said alkali metal aluminum hydride is lithium aluminum hydride.

5. The process of claim 1 wherein said alkylaromatic hydrocarbon is a xylene and said alkali metal aluminum hydride is lithium aluminum hydride.

6. The process of claim 1 wherein said alkylaromatic hydrocarbon is isopropylbenzene and said alkali metal aluminum hydride is lithium aluminum hydride.

7. The process of claim 1 wherein said alkylaromatic hydrocarbon is n-propylbenzene and said alkali metal aluminum hydride is lithium aluminum hydride.

References Cited in the file of this patent

UNITED STATES PATENTS

| | | |
|---|---|---|
| 2,186,022 | Holm et al. | Jan. 9, 1940 |
| 2,448,641 | Whitman | Sept. 7, 1948 |
| 2,548,803 | Little | Apr. 10, 1951 |
| 2,576,311 | Schlesinger et al. | Nov. 27, 1951 |
| 2,636,910 | Crouch | Apr. 28, 1953 |
| 2,769,850 | Closson et al. | Nov. 6, 1956 |
| 2,771,495 | Pines et al. | Nov. 20, 1956 |

U. S. DEPARTMENT OF COMMERCE

PATENT OFFICE

CERTIFICATE OF CORRECTION

Patent No. 2,823,240                      February 11, 1958

Edmund Field et al.

It is hereby certified that error appears in the printed specification of the above numbered patent requiring correction and that the said Letters Patent should read as corrected below.

Columns 3 and 4, in the table, opposite "n-propylbenzene" in Example 2, insert --37.7--; column 7, line 54, for "dihpenylmethane" read --diphenylmethane--; line 74, for "addiiton" read --addition--; column 9, line 13, for "dilument" read --diluent--; column 10, line 24, for "prodced" read --produced--.

Signed and sealed this 8th day of April 1958.

(SEAL)
Attest:

KARL H. AXLINE

Attesting Officer

ROBERT C. WATSON
Commissioner of Patents